United States Patent [19]

Golser et al.

[11] 4,311,802
[45] Jan. 19, 1982

[54] PROCESS AND APPARATUS FOR THE CONTINUOUS PRODUCTION OF FOAMED PLASTICS MATERIAL HAVING IMPROVED FIRE RESISTANCE

[75] Inventors: Leopold Golser, Leonding; Helmut Woisetschlager, Linz, both of Austria

[73] Assignee: Chemie Linz Aktiengesellschaft, Linz, Austria

[21] Appl. No.: 183,675

[22] Filed: Sep. 2, 1980

[30] Foreign Application Priority Data

Sep. 7, 1979 [DE] Fed. Rep. of Germany ....... 2936299

[51] Int. Cl.³ .............................................. C08J 9/00
[52] U.S. Cl. .................... 521/133; 422/133; 521/82; 521/136; 521/158; 521/917
[58] Field of Search ................ 521/136, 82, 133, 158, 521/917

[56] References Cited

U.S. PATENT DOCUMENTS

| | | | |
|---|---|---|---|
| 3,523,093 | 8/1970 | Stamberger | 521/136 |
| 3,632,531 | 1/1972 | Rush et al. | 521/136 |
| 4,043,950 | 8/1977 | Wilmsen et al. | 521/136 |
| 4,096,101 | 1/1978 | Blahak et al. | 521/136 |
| 4,122,049 | 10/1978 | Wagner | 521/136 |
| 4,130,697 | 12/1978 | Stern et al. | 521/136 |
| 4,139,501 | 2/1979 | Rudner | 521/136 |
| 4,160,075 | 7/1979 | Golser | 521/136 |
| 4,176,217 | 11/1979 | Golser et al. | 521/106 |

FOREIGN PATENT DOCUMENTS 1918181 8/1970 Fed. Rep. of Germany ...... 521/136

Primary Examiner—Morton Foelak
Attorney, Agent, or Firm—Ladas & Parry

[57] ABSTRACT

A continuous process for the production of flame-resistant foamed plastics material by condensation of aqueous aminoplast precondensates with diisocyanates or polyisocyanates, wherein, in a first mixing stage, the isocyanate is mixed with 4 to 14% by weight of catalyst, the catalyst being an organic amine and/or an organic metal compound, at temperatures of 40° to 130° C., with a residence time of 1 to 8 seconds, and directly thereafter, in a second mixing stage, the aminoplast precondensate and, simultaneously but separately from the aminoplast, an acid curing catalyst are introduced, after which the foamable mixture thereby produced is discharged continuously. The apparatus for performing this process comprises two mixing chambers connected in series, the first mixing chamber being coolable and the mixing chambers being connected via a nozzle, the ratio of the cross-section on the narrowest point of the nozzle to the sum of the cross-sections of the feed lines supplying the first mixing chamber being 0.3:1 to 0.9:1.

4 Claims, 2 Drawing Figures

PROCESS AND APPARATUS FOR THE CONTINUOUS PRODUCTION OF FOAMED PLASTICS MATERIAL HAVING IMPROVED FIRE RESISTANCE

BACKGROUND OF THE INVENTION

The present invention relates to a continuous process for the preparation of foamed plastics material which is formed by reaction of diisocyanates or polyisocyanates with aminoplast precondensates and exhibits improved fire resistance, and to an apparatus for carrying out the process.

Processes for the preparation of aminoplast precondensates with the aim of combining the good properties of the two types of plastics materials, that is to say the aminoplasts and the polyurethane plastics, with one another are already known.

Thus, for example, U.S. Pat. No. 3,632,531 discloses the preparation of polyurethane foams by the condensation of organic polyisocyanates with so-called "methylol resins", that is to say aminoplast precondensates, under the catalytic action of organic tin salts and secondary or tertiary amines. The disadvantage is that the water content of the reaction system in this process and in the other similar processes known hitherto should be far below 10% and this means that industrially available aminoplast precondensate solutions which contain considerable amounts of water, have first to be evaporated before they are used. Furthermore, after-curing is necessary in order to achieve optimum flame resistance and the necessary mechanical strength. On the other hand, acid compounds are regarded as condensation retarders for polyurethanes (see for example, Kunststoff-Handbuch (Plastics Handbook) Carl Hanser-Verlag, volume x, 1966, page 151).

West German Offenlegungsschrift No. 1,918,181 discloses the preparation of foams from urea/formaldehyde or melamine/formaldehyde resins, and particularly phenol/formaldehyde resins by reaction with isocyanates in two stages; the formaldehyde resin first being produced in the presence of an acid catalyst and in the presence of a blowing agent, such as a fluorinated hydrocarbon, and the isocyanate being added only subsequently. Since, as is known, urea/formaldehyde, melamine/formaldehyde and phenol/formaldehyde resins rapidly undergo complete condensation in an acid medium, only a few free hydroxy groups are still available for the reaction with the isocyanate in a process of this type, so that uniform distribution of the formaldehyde resin and polyurethane elements in the condensation product is not achieved.

United Kingdom Pat. No. 1,541,776 discloses that it is possible to prepare, from an aminoplast precondensate and a polyisocyanate, light foams which, apart from the carbon dioxide supplied by the reaction of the polyisocyanate with water, require no further foaming agent, if the aminoplast component is employed as an aqueous solution of a water-soluble precondensate, the amount of polyisocyanate is so chosen that both a significant condensation reaction takes place with the precondensate and an optimum blowing reaction takes place with water and if certain combinations of acid and basic or metal-organic catalysts are employed, it being necessary to carefully control the addition of the latter. In this way it is possible to produce foams which have good combustion and insulating characteristics, and which cure tack-free without further heat after-treatment, in an economical manner, in a single process step and with short production times.

Accordingly, United Kingdom Pat. No. 1,541,776 claims a process for the preparation of a flame-resistant foamed plastics material which comprises condensing a water-soluble aminoplast precondensate of formaldehyde and urea and/or melamine, containing at least one N-methylol group and having a water content of 3 to 50% by weight, with an organic isocyanate, which is at least bi-functional, in the presence of 0.5 to 5.0% by weight relative to the foamable mixture of an acidic curing catalyst and in the presence of an organic amine as basic catalyst and optionally additionally an organic metal compound which also has a catalytic action, the said aminoplast precondensate being added to the organic isocyanate, to which the amine or amine and organic metal compound has previously been added, at the same time as, but separately from the acid curing catalyst, the ratio of water to organic isocyanate being from 0.05 to 4.0:1 parts by weight.

The process disclosed in United Kingdom Pat. No. 1,541,776 may be carried out discontinuously very successfully. However, difficulties arise when it is attempted to carry out the process continuously under optimum conditions.

The difficulties are essentially concerned with the fact that the preparation of the pre-adduct of the organic polyisocyanate with the basic catalyst (above all with the amines containing hydroxyl groups) is extremely difficult because of the high rate of reaction, the high heat of reaction and the associated rapid rise in viscosity of the pre-adduct formed. As is well-known, in the case of polyurethane foams the basic catalyst is first added to the polyol and is only then, diluted in this manner, added to the organic isocyanate. Because of the special nature of the process according to United Kingdom Pat. No. 1,541,776 the basic catalyst must be added directly to the organic polyisocyanate and in particular must necessarily be added in extremely high concentrations of up to 14% by weight, relative to the polyisocyanate. This may result in premature gelling of the pre-adduct formed, which then prevents continuous production of the foams because the conventional foaming apparatus rapidly becomes blocked. As a result, trouble-free production of a satisfactory product becomes impossible.

Surprisingly, it has now been found that the disadvantages described above can be avoided if the process is carried out in two defined stages and the polyisocyanate and the basic catalyst and organic metal compound are brought together in the first mixing stage at quite specific temperatures and with specific residence times.

SUMMARY OF THE INVENTION

Accordingly, the present invention provides a process for the continuous production of a flame-resistant foamed plastics material which comprises condensing an aqueous solution of a water-soluble aminoplast precondensate or a precursor thereof with an organic isocyanate which is at least bifunctional in the presence of an acidic curing catalyst to cure the aminoplast precondensate and in the presence of an organic amine as basic catalyst and, optionally, additionally an organic metal compound, the said water-soluble aminoplast precondensate or the precursor thereof being added, simultaneously with but separately from the acid curing catalyst, to the isocyanate to which the amine and, where relevant, the organic metal compound has been added previously, and the isocyanate being present in an amount, relative to the water, which permits a crosslinking reaction with the methylol groups of the aminoplast precondensate or of the precursor thereof, the said basic catalyst and, where relevant, the organic metal compound, being added in a first mixing stage to the isocyanate in an amount of 4 to 14% by weight, relative to the amount of isocyanate, the residence time of the pre-adduct formed from the catalyst and the organic isocyanate being from 1 to 8 seconds in the first mixing stage at a reaction temperature within the range of 40° to 130° C., after which the pre-adduct is immediately transferred to a subsequent second mixing stage into which the aminoplast precondensate and acid catalyst are introduced, following which the foamable reaction mixture is discharged continuously.

DETAILED DESCRIPTION OF THE INVENTION

In the process of the invention the amount of catalyst to be admixed with the isocyanate in the first mixing stage is preferably 6 to 12% by weight and, advantageously, the amount is so chosen that, in respect to the basicity, the amount is less than equivalent to the amount of acid catalyst added in the second mixing stage. It is furthermore to be noted that, if necessary, the curing time of the resulting foam may be substantially reduced by increasing the excess of acid catalyst.

The residence time in the first mixing stage is preferably 1 to 5 seconds and preferably the reaction temperature is within the range of 55° to 100° C. The optimum balance of these parameters however depends, inter alia, on the particular isocyanates and the basic catalyst used and may be determined by trial experiments. Because of the complex nature of the system comprising the isocyanate and the high concentrations of basic catalyst and organic metal compound employed, interrelations between the two parameters mentioned are not readily discernible.

The conditions in the second mixing stage, into which the aminoplast precondensate and the acid catalyst are introduced separately from one another, are less critical. The residence time of the foamable reaction mixture prepared in the second stage merely may be chosen to be such that adequate mixing of the materials employed takes place without premature curing.

The present invention also relates to an apparatus for carrying out the process according to the invention, which consists of two mixing chambers which are separate but directly connected to one another, the residence time, which is characteristic of the process, in the first mixing chamber being achieved by an appropriate choice of the ratio of the sum of the free cross-sections of the feed lines supplying the first mixing chamber to the free cross-section of the connection between the first and the second mixing chamber, which is in the form of a nozzle.

Accordingly the invention further provides an apparatus for carrying out the process described above, which comprises two mixing chambers operative connected to each other, the first mixing chamber having a plurality of feed lines for the introduction of reactants therein, a stirrer located along the central axis of the chamber, a cooling jacket surrounding the chamber and having an inlet and an outlet, and a nozzle at the lower end of the chamber leading directly into the second mixing chamber; the second mixing chamber having feed lines for the introduction of additional reactants into the chamber, a stirrer located along the central axis of the chamber and an orifice at the lower end for continuously discharging the foamable reaction product from the chamber; the ratio of the free cross-section of the narrowest point of the nozzle to the sum of the free cross-sections of the feed lines leading into the first chamber being 0.3:1 to 0.9:1.

A preferred embodiment of the apparatus according to the invention is illustrated in the accompanying drawings, in which.

Figures 1, 2:
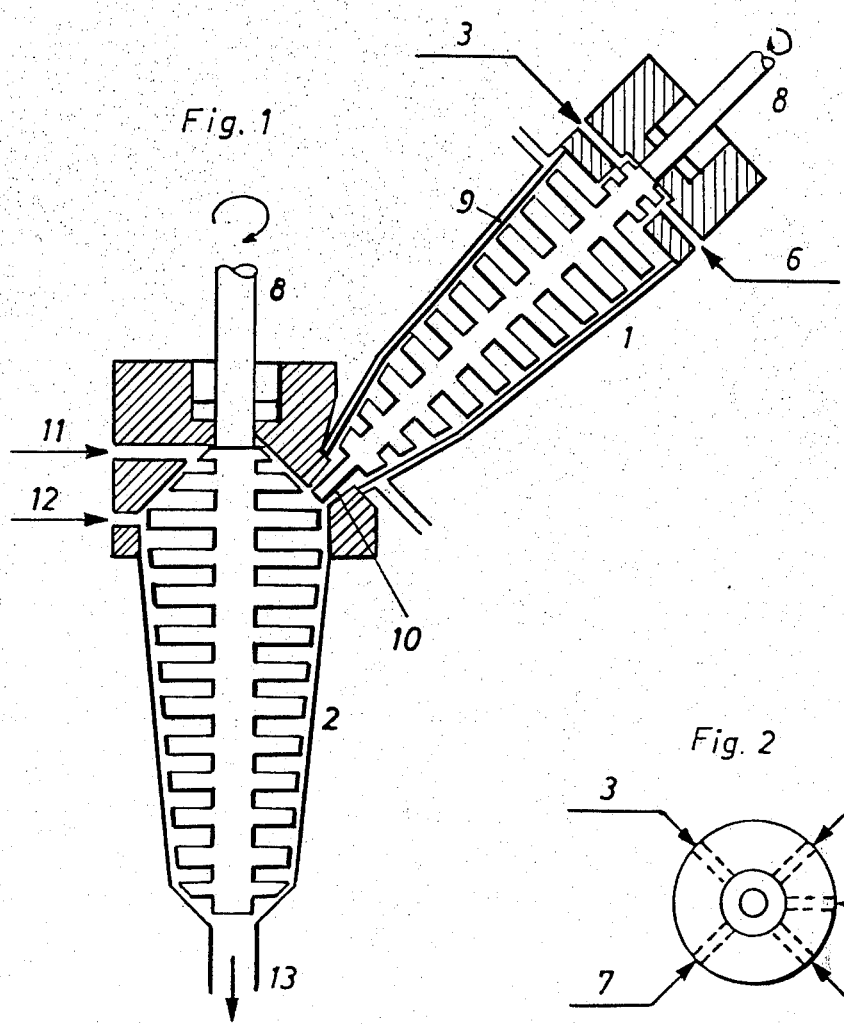
FIG. 1 is a longitudinal section of the apparatus.
FIG. 2 is a cross-section through the upper part of the first mixing stage.

The apparatus illustrated in FIG. 1 comprises a chamber 1 for the first mixing stage and a chamber 2 for the second mixing stage. As illustrated in FIG. 2, the upper part of chamber 1 contains feed lines 3, 4, 5 and 6 for the introduction of the isocyanates, the foam stabilizer, the basic catalyst or catalysts and/or the organic metal compound. If required, a flushing agent for cleaning purposes may be introduced through line 7. The mixing chamber 1 is surrounded by a cooling jacket 9 and terminates at its lower end in the nozzle 10, through which the pre-adduct formed in this chamber is transferred directly into the second mixing chamber 2 for the second stage. The cross-section of the nozzle 10 at its narrowest point is such that the ratio thereof to the sum of the free cross-sections of the feed lines 3, 4, 5 and 6 is 0.3:1 to 0.9:1. The desired residence time is maintained, within the limits according to the invention, by appropriate choice of these cross-sections within the range according to the invention. The centrally disposed spine stirrers with which the mixing chambers 1 and 2 are provided are marked 8. The aminoplast precondensate is supplied through the feed line 11 and the acid catalyst through the feed line 12. The foamable reaction mixture is discharged at 13.

The Examples which follow illustrate the process according to the invention in greater detail.

EXAMPLE 1

The following components for the preparation of the pre-adduct are introduced, per hour, into the mixing chamber 1, which is provided with a spine stirrer 8, running at 3,000 revolutions per minute: 90.6 kg of crude diphenylmethane diisocyanate through feed line 3, 5.43 kg of silicone oil, as a foam stabilizer, through feed line 4 and 7.24 kg of triethanolamine and 0.91 kg of dimethylethanolamine (a total of 9.0% by weight, relative to the polyisocyanate) through feed lines 5 and 6.

The thoroughly mixed contents water-cooled to 87° C., by means of the cooling jacket 10, leave the mixing chamber 1 after a residence time of 3 seconds and enter the directly adjoining mixing chamber 2 through the nozzle 10. There, 362.3 kg of aqueous urea-formaldehyde precondensate solution, having a solids content of 90%, and 9.6 kg of benzoyl chloride are added, through feed lines 11 and 12, to the liquid pre-adduct, whilst stirring with a spine stirrer 8 at 3,000 revolutions per minute. After a residence time of 1 second the foamable mixture leaves the mixing chamber 2 through the orifice 13.

After 2 minutes, a foam having a density of 18 kg/m$^3$ is obtained.

EXAMPLE 2

The following amounts, which in part differ from Example 1, are introduced into the mixing chamber 1 in a similar manner to that described in Example 1: 90.6 kg of diphenylmethane diisocyanate, 5.43 kg of silicone oil, 7.55 kg of triethanolamine and 0.18 kg of dimethylethanolamine. Residence time: 3 seconds. The temperature of the pre-adduct before entering the mixing chamber 2 was 82° C.

In mixing chamber 2 the pre-adduct was mixed with 362.3 kg of urea-formaldehyde precondensate solution, having a solids content of 90%, and 10.14 kg of benzoyl chloride. The foamable mixture, discharged onto the conveyor belt of a block-foaming installation, expanded within two minutes. The density of the resulting foam was 25 kg/m$^3$ and the foam structure was once again uniform with fine cells.

EXAMPLE 3

The following amounts, which in part differ from Example 1, are introduced into the mixing chamber 1 in a similar manner to that described in Example 1: 98.2 kg. diphenylmethane diisocyanate, 5.43 kg of silicone oil and 7.58 kg. of triethanolamine. Residence time: 3.5 seconds. The temperature of the pre-adduct before entering the mixing chamber 2 was 85° C.

In mixing chamber 2 was 85° C.

In mixing chamber 2 the pre-adduct was mixed with 367.2 kg. of urea-formaldehyde precondensate solution, having a solids content of 90%, and 8.1 kg. of benzoyl chloride.

The foamable mixture, discharged onto the conveyor belt of a block-foaming installation, expanded within 2 minutes. The density of the resulting foam was 32 kg/m$^3$ and the foam structure was once again uniform with fine cells.

We claim:

1. A process for the continuous production of a flame-resistant foamed plastics material which comprises condensing an aqueous solution of a water-soluble aminoplast precondensate or a precursor thereof with an organic isocyanate which is at least bifunctional in the presence of an acidic curing catalyst to cure the aminoplast precondensate and in the presence of an organic amine as basic catalyst and, optionally, additionally an organic metal compound, the said water-soluble aminoplast precondensate or the precursor thereof being added, simultaneously with but separately from the acid curing catalysts, to the isocyanate to which the amine and, where relevant, the organic metal compound has been added previously, and the isocyanate being present in an amount, relative to the water, which permits a cross-linking reaction with the methylol groups of the aminoplast precondensate or of the precursor thereof, the said basic catalyst and, where relevant, the organic metal compound, being added in a first mixing stage to the isocyanate in an amount of 4 to 14% by weight, relative to the amount of isocyanate, the residence time of the pre-adduct formed from the catalyst and the organic isocyanate being from 1 to 8 seconds in the first mixing stage at a reaction temperature within the range of 40° to 130° C., after which the pre-adduct is immediately transferred to a subsequent second mixing stage into which the aminoplast precondensate and acid catalyst are introduced, following which the foamable reaction mixture is discharged continuously.

2. A process according to claim 1, in which the amount of catalyst added to the isocyanate is 6 to 12% by weight.

3. A process according to claim 1, in which the residence time in the first mixing stage of the pre-adduct formed from the catalyst and isocyanate is 1 to 5 seconds.

4. A process according to claim 1, in which the reaction temperature in the first mixing stage is within the range of 55° to 100° C.

* * * * *